United States Patent [19]

Cormier

[11] 4,079,815

[45] Mar. 21, 1978

[54] EXTENSIBLE STEP ASSEMBLY

[76] Inventor: Jean-Paul Joseph Cormier, 1 Sifroi Court, Dieppe, New Brunswick, Canada

[21] Appl. No.: 796,617

[22] Filed: May 13, 1977

[30] Foreign Application Priority Data
Apr. 21, 1977   Canada .................................. 276675

[51] Int. Cl.² ............................................ B60R 3/02
[52] U.S. Cl. .................................... 182/195; 182/91; 182/97; 280/166
[58] Field of Search ................ 182/195, 91, 95, 97, 182/98; 280/166

[56] References Cited

U.S. PATENT DOCUMENTS

| 988,593 | 4/1911 | Poss | 182/95 |
| 1,195,869 | 8/1916 | Taylor | 182/95 |
| 2,611,466 | 9/1952 | Biggert | 182/166 |
| 3,774,720 | 11/1973 | Hovey | 182/195 |
| 4,021,071 | 5/1977 | Norman | 182/97 |

Primary Examiner—Reinaldo P. Machado

[57] ABSTRACT

An extensible step assembly having steps secured to sections of extensible or telescoping arms whereby the assembly can be moved from a retracted compact position to an extended position for use.

10 Claims, 10 Drawing Figures

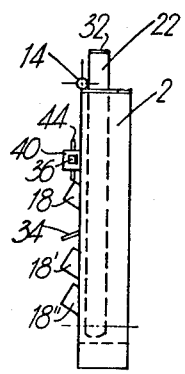
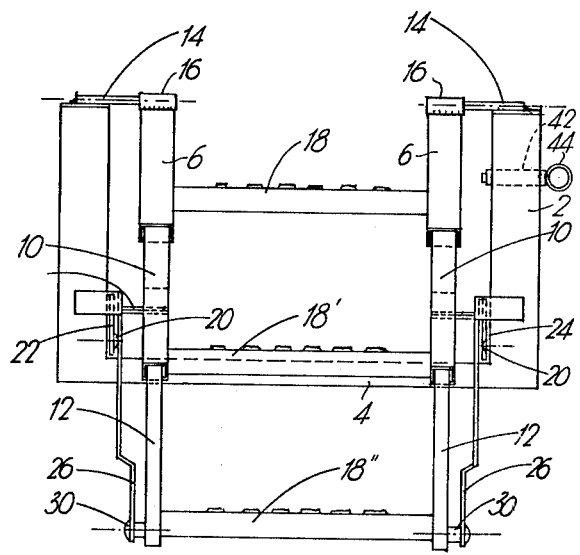
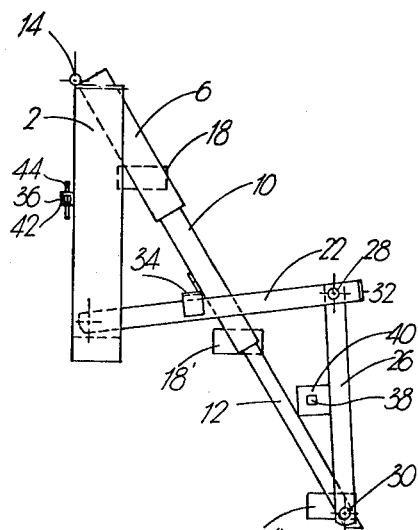
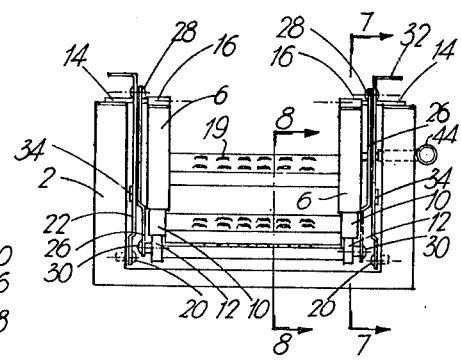

EXTENSIBLE STEP ASSEMBLY

The present invention relates to a step or rung assembly which is extensible from a retracted position to an extended or useable position.

BACKGROUND OF THE INVENTION

There has long been a need for an arrangement which is adaptable for securement to the platform of a truck or other vehicle to facilitate movement of workers between the ground or roadway and the platform of a truck. Many trucks whether they be closed or open have a platform which is 4 or 5 feet high, and it is difficult and tiring for workers to have to continually boost themselves up on to such a platform, and of course the chance of injury always is present when one is dropping from such a height.

PURPOSE AND OBJECTS OF THE INVENTION

The present invention is primarily intended for use with trucks or the like to provide convenience of access to the back of a truck having a fairly high platform and to assist one in leaving such a truck. As the discussion of the present invention proceeds, however, other uses of the inventive extensible step or rung assembly will become apparent, such as in swimming pools or at dockside where one wishes to provide convenient steps and yet which can be retracted as desired.

The assembly is constructed to be, when in retracted position, positioned behind the outer plane of framing members which provide protection for the movable elements. With this arrangement, when the assembly is positioned on a truck and contact is made with an obstruction (such as a loading dock) the impact is taken by the framing members with no damage being done to the extensible assembly itself.

The principal object of the invention is to provide a retractable step assembly which will assist operators in the mounting and leaving of an elevated platform or the like, and which is strong and durable.

The assembly is preferably mounted below the rear edge of a platform which may be the platform of a truck where it does not interfere with the loading or unloading of the truck such as when the truck is backed into a loading dock and a further object of the invention is to provide a retractable step assembly surrounded by relatively heavy framing members with the movable portions being recessed behind the outer plane of the framing members so that in the event that a truck is backed forcefully against a loading dock, the impact is absorbed by the framing members thus avoiding damage to the movable portions.

These and other objects are satisfied by the present invention which specifically provides an extensible step assembly comprising two spaced upright frame members, and upper sections of two spaced extensible or telescoping arms pivotally secured of an adjacent upper ends of the upright frame members, each extensible arm comprising one of the said upper sections and at least one further section adapted to be telescopingly received within the upper section, and a rung or step extending horizontally between the said upper sections, and a rung or step extending horizontally between a pair of said further sections, and a lever arm having one end pivotally secured to each upright frame member between the pivotal securement of the said upper sections, and a brace arm pivotally secured at one of its ends to each of the said further sections, the other ends of the brace arms being pivotally secured to the lever arms adjacent their other ends, whereby the extensible arms are extensible from a position between the upright frame members to an extended position for use.

BRIEF DESCRIPTION OF THE DRAWINGS

The invention will now be more fully described with reference to the accompanying non-limiting embodiment as shown in the attached drawings and wherein:

FIG. 3 is a front view of the assembly shown in FIG. 2 and in extended position;

FIG. 4 is a side view of the extended assembly as shown in FIGS. 2 and 3;

FIG. 5 is a front view of the assembly in closed or retracted position as shown in FIG. 1;

FIG. 6 is a side view of the assembly shown in FIGS. 1 and 5;

DETAILED DESCRIPTION OF DRAWINGS

Figure 1:
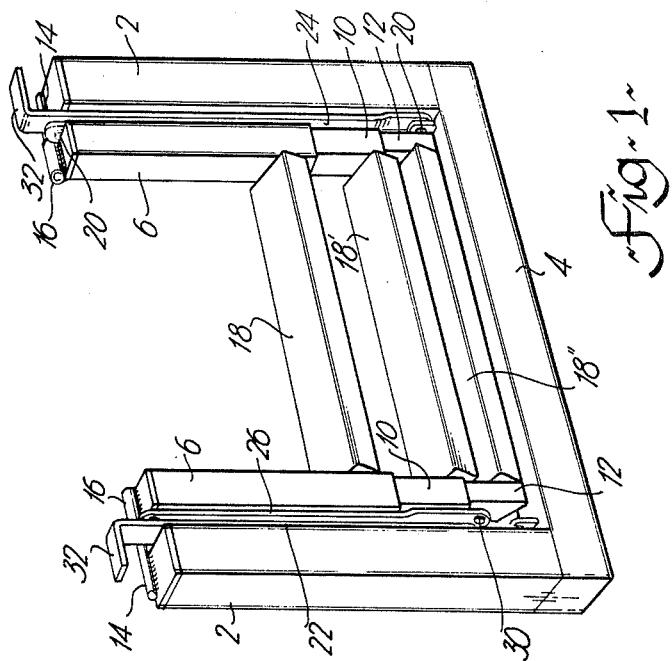
FIG. 1 illustrates the adjustable step assembly of the invention in perspective view in closed position.

The accompanying drawings which specifically illustrate one embodiment of the inventive concept will now be discussed in detail.

Supporting framing members for the retractable step assembly consists of two parallel and spaced upright frame member 2, which as shown in the drawings, are connected together by a lower horizontally extending frame member 4, which together with the upright frame members 2 provide framing of generally U-shaped configuration.

Inwardly of and adjacent the upper ends of the upright frame members 2, upper or first sections 6 of a pair of extensible or telescoping arms, which in the drawings are indicated generally by numeral 8 are pivotally mounted. Each of the telescoping arms 8 consist of upper or first sections 6, second or intermediate sections 10 and lower or third sections 12, and each of the telescoping arms 8 is adapted for movement from a closed or retracted position as shown in FIGS. 1, 5, 6, 7, and 8, to a fully extended position as shown in FIGS. 2, 3, and 4.

Figure 7:
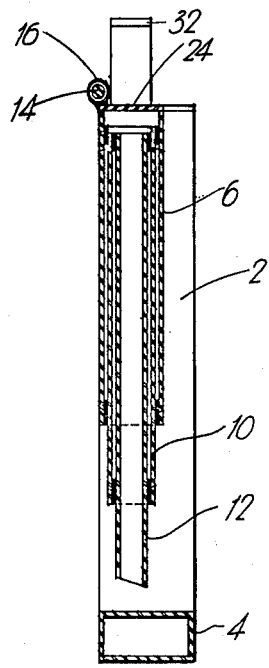
FIG. 7 is a sectional view taken along line 7—7 of FIG. 5.

The third or lower section 12 is, of course, of smaller cross-sectional area than the second or intermediate section 10 and the third section is adapted to be received withing the second section 10 in a manner as shown in cross-section in FIG. 7. Also, the second section 10 is of smaller cross-sectional area than the first or upper section 6 and is adapted to be received within the upper section 6 also as clearly shown in cross-sectional view in FIG. 7. These telescoping sections can be circular in cross-section or rectangular or polygonal in cross-section and movement of these various sections from the retracted arrangement shown in FIG. 1, to the extended position shown in FIG. 2 and vice-versa will clearly be understood.

Figure 10:
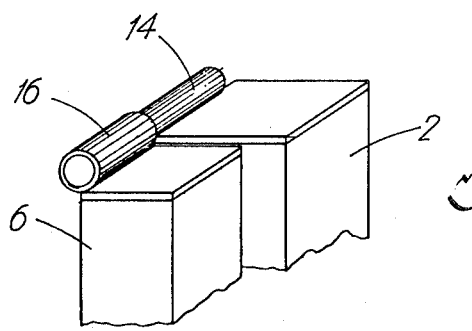
FIG. 10 is an enlarged view of a portion of the assembly showing a pivoting arrangement.

The uppermost sections 6 are pivotally secured to the upper ends of the upright frame member 2. Although various pivoting arrangements could be used, FIG. 10 shows in enlarged detail a suitable arrangement consisting of a pivot pin 14 welded or otherwise secured to the upper end of the upright frame members 2 and which is rotatably received within a pivot socket 16 which is welded or otherwise secured to the upper end of the first or upper telescoping member 6.

Extending between each of the respective pairs 6, 10, 12, of the telescoping sections are rungs or steps 18, 18' and 18" respectively. Specifically, step or rung 18 extends between the first or upper telescoping sections 6; step or rung 18' extends between the intermediate sections 10; and step or rung 18" extends between the third or lower telescoping sections 12.

Figure 8:
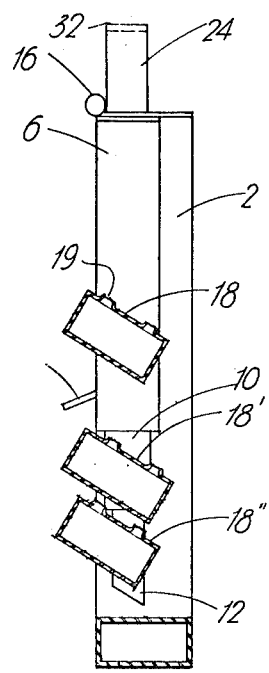
FIG. 8 is a sectional view taken along line 8—8 of FIG. 5.
Figure 9:
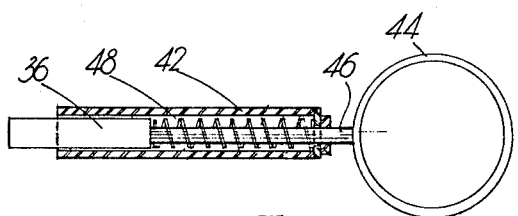
FIG. 9 is an enlarged partially sectioned view of one embodiment of a locking assembly.

The rungs or steps may also be provided with roughened anti-slip surfaces such as shown at 19 in FIGS. 5 and 8.

The steps or rungs 18, 18' and 18" are preferably securely fastened to their respective pairs of telescoping sections as by welding, bolting, or the like. Alternatively, however, the steps or rungs could be mounted for limited axial rotation and be provided with springs normally biasing the steps to assume a position where the top surfaces of the steps are in parallel planes and parallel with the front surfaces of their respective telescoping sections. This arrangement even further receses the steps inwardly of the protective framing 2 and 4. In use the weight of a person using the steps causes pivoting movement of the steps against the spring action to a normal horizontal step position.

Pivotally secured inwardly of and at the lower ends of the upright frame members 2 as by bolts 20 are lever arms 22 and 24. Adjacent their outer or upper ends the levers arms 22 and 24 are pivotally secured to the upper ends of brace arms 26 by means of pivot pins 28. The lower ends of the brace arms 26 are pivotally secured to the third or lower telescoping sections 12 by pins 30 as shown in the drawings, particularly FIG. 2.

The outer or upper ends of the lever arms are provided with lever arm handles 32 for the purpose which will be described below.

In view of the telescoping arrangement of the sections 6, 10 and 12 it will be appreciated that the assembly may be moved from its retracted position recessed and protected within the framing 2, 4, as shown in FIGS. 1, 6, 7 and 8, to an extended or position of use as shown in FIGS. 2 and 4.

The extension of the assembly is arrested by stop 34 secured intermediate the ends of the lever arms 22 and 24 which during extension of the telescoping sections contacts the inner surfaces of intermediate telescoping sections 10 to hold the assembly in supported and sturdy position as shown in FIGS. 2 and 4. The provision of stop 34 is preferred but the assembly is quite operable without it, and extension of the telescoping arms 8 will stop when the telescoping sections reach their ends of travel and the telescoping arms will rest against the lower frame member 4.

Figure 2:
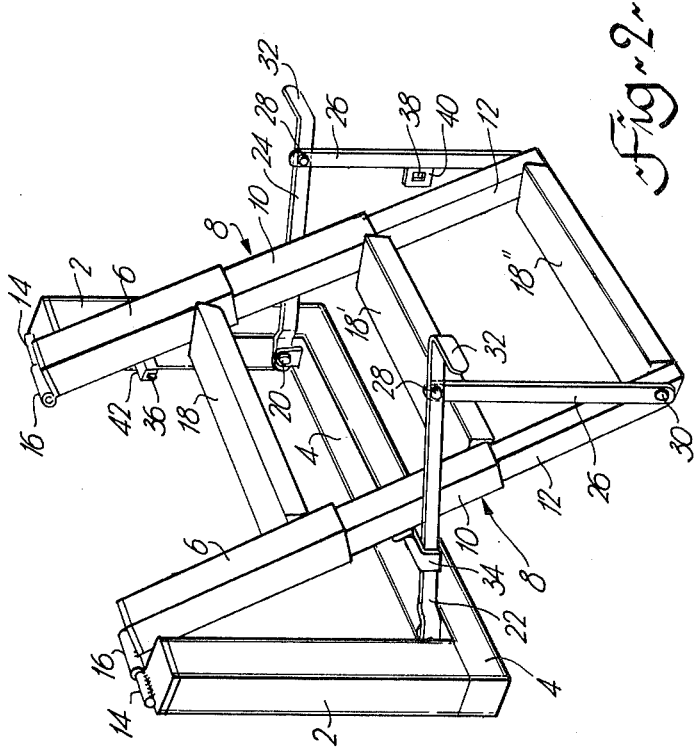
FIG. 2 illustrates in perspective view the assembly in accordance with FIG. 1 in extended position.

In order that the assembly will not inadvertently extend from the retracted position as shown in FIG. 1 to the extended position as shown in FIG. 2, suitable lock means may be provided. One embodiment of a suitable lock is shown in the drawings, and in enlarged partially sectioned view in FIG. 10. The lock includes a lock pin 36 which is engageable in an opening 38 provided in plate 40 secured to one of the brace arms 26.

A sleeve 42 carrying the lock pin 36 is secured to one of the upright frame members 2 as shown in FIG. 2 and when the assembly is in its retracted position, the lock pin 36 enters into the opening 38 provided in the plate 40 as will be understood from FIG. 6.

To release the locking assembly, ring 44 which is connected to the lock pin 36 by shaft 46 is moved against the action of spring 48 to retract the lock pin 36 from plate 40 and permit the assembly to be lowered. Although not specifically shown in the drawings, the outer end of lock pin 36 could be bevelled in known manner so that the lock is automatically engaged when the assembly is moved to retracted position. Of course, other locking arrangements could be utilized as desired.

The invention is preferably operated manually. However, the nature of the telescoping assemblies 8 is particularly well suited for hydraulic or pneumatic operation and the simple sections 6, 10 and 12 could be substituted by a double acting hydraulic or pneumatic cylinder in place of section 6 with sections 10 and 12 acting as piston rods in the cylinder.

The drawings show three pairs of sections 6, 10 and 12 and the three associated steps or rungs 18, 18' and 18". The invention however, is not limited to this specific number and only two pairs of sections with two rungs, or more than three pairs of sections with associated rungs could also be employed without departing from the inventive concept.

The assembly may be bolted directly through the frame members 2 and 4 to a supporting structure such as the frame of a truck or additional frame members or supported can be utilized if necessary. Depending on the particular support to which the structure may be secured, the presence of lower framing member may not be required.

For industrial applications, for example, when used on trucks the present assembly will be constructed of heavy gauge metal material. If, however, use is of a lighter nature suitable high impact plastic material may advantageously be employed.

I claim:
1. An extensible step assembly comprising
two spaced upright frame members, and
upper sections of two spaced extensible or telescoping arms pivotally secured of an adjacent upper ends of the upright frame members,
each extensible arm comprising one of the said upper sections and at least one further section adapted to be telescopingly received within the upper section,
and a rung or step extending horizontally between the said upper sections, and a rung or step extending horizontally between a pair of said further sections,
and a lever arm having one end pivotally secured to each upright frame member between the pivotal securement of the said upper sections,
and a brace arm pivotally secured at one of its ends to each of the said further sections,
the other ends of the brace arms being pivotally secured to the lever arms adjacent their other ends,
whereby the extensible arms are extensible from a position between the upright frame members to an extended position for use.
2. Assembly according to claim 1, said further sections comprising a plurality of pairs of telescoping sections, and a step or rung secured horizontally between each pair, the said one end of the brace arms being pivotally secured to the lowermost pair of telescoping sections.

3. Assembly according to claim 1, including stop means carried by the lever arms to limit the extension of the extensible arms.

4. Assembly according to claim 1, further including releasable lock means to hold the assembly in retracted position against inadvertent extension.

5. Assembly according to claim 1, wherein the said other ends of the lever arms are formed as handles to facilitate manual extension and retraction of the assembly.

6. Assembly according to claim 1, wherein when retracted the extensible arms, steps and lever and brace arms are recessed behind a plane frontal of the upstanding frame members.

7. An extensible step assembly comprising two spaced upright frame members and a lower frame member extending between and secured to the upright frame members to provide a supporting frame of generally U-configuration, upper sections of two extensible or telescoping arms being pivotally secured inwardly of and adjacent upper ends of the upright frame members, each extensible arm comprising one of the said upper sections, and an intermediate section adapted for telescoping relationship with its associated upper section, and a lower section adapted for telescoping relationship with its associated intermediate and upper sections, and a step or rung extending horizontally between and secured to each pair of upper sections, intermediate sections and lower sections, and a lever arm having one end pivotally secured to and inwardly each upright frame member adjacent the lower frame member, and a brace arm pivotally secured at one of its ends to each of the lower sections, the other ends of the brace arms being pivotally secured to the lever arms adjacent their other ends, whereby the extensible arms are extensible from a position between the upright frame members to an extended position for use.

8. An assembly according to claim 7, wherein when retracted the extensible arms, steps and lever arms and brace arms are recessed behind a plane frontal of the upstanding and lower frame members.

9. Assembly according to claim 7, including stop means carried by the lever arms to limit the extension of the extensible arms.

10. Assembly according to claim 7, wherein the said other ends of the lever arms are formed as handles to facilitate manual extension and retraction of the assembly.

* * * * *